(No Model.)
J. J. RICKETTS.
CONNECTION FOR WATER CLOSETS.
No. 511,161. Patented Dec. 19, 1893.
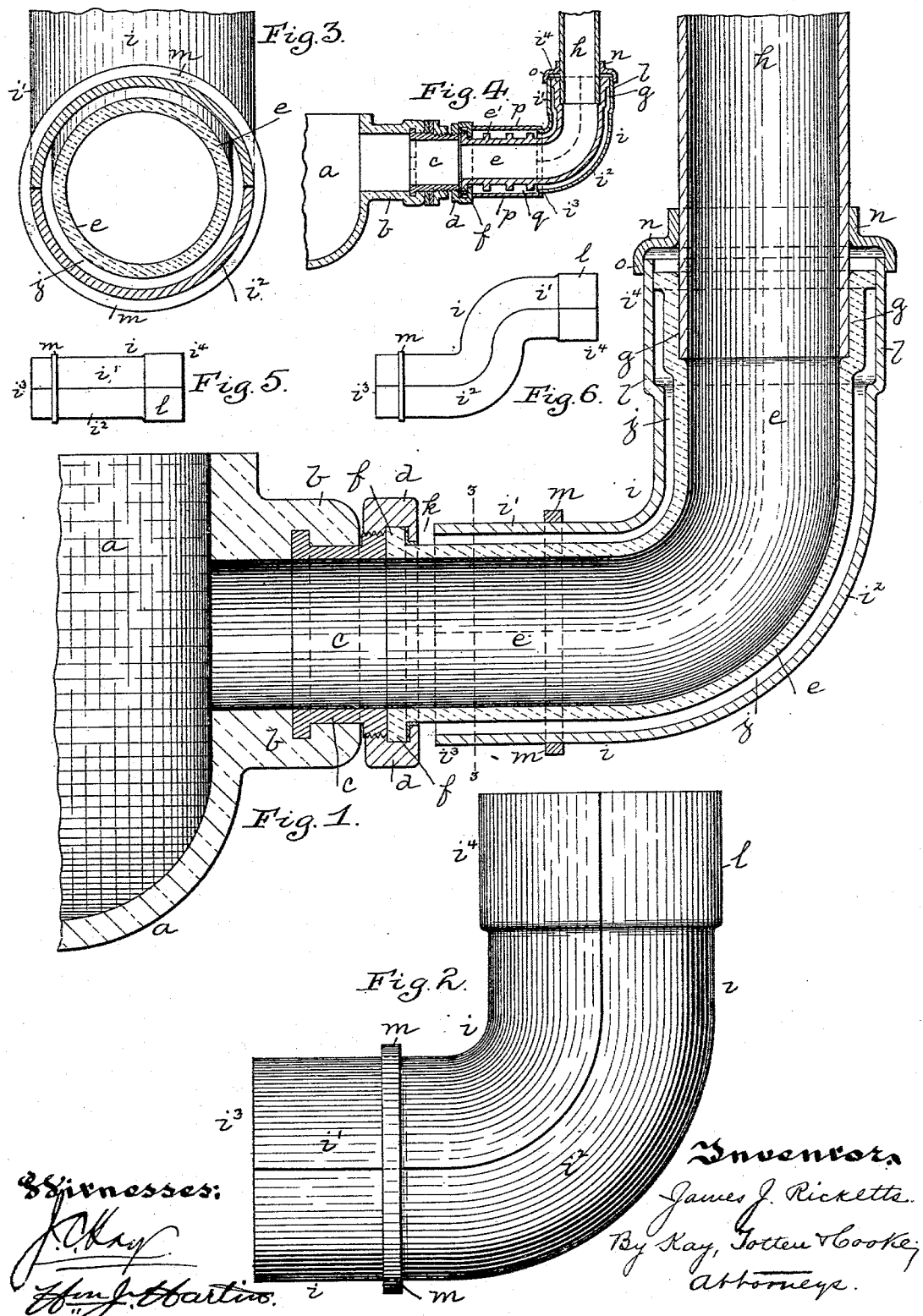

UNITED STATES PATENT OFFICE.

JAMES J. RICKETTS, OF PITTSBURG, PENNSYLVANIA.

CONNECTION FOR WATER-CLOSETS.

SPECIFICATION forming part of Letters Patent No. 511,161, dated December 19, 1893.

Application filed January 31, 1893. Serial No. 460,360. (No model.)

*To all whom it may concern:*

Be it known that I, JAMES J. RICKETTS, a resident of Pittsburg, in the county of Allegheny and State of Pennsylvania, have invented a new and useful Improvement in Connections for Water-Closets; and I do hereby declare the following to be a full, clear, and exact description thereof.

My invention relates to connections for water closets, and has special reference to the couplings or joints which connect the flush pipe with the horn on the bowl. The particular class of couplings or joints are those shown and described in Letters Patent Nos. 434,116 and 434,117, granted to me on August 12, 1890, which have the elbow or joint formed of rubber or other suitable material, so as to form a flexible connection. One of the difficulties with the use of these flexible connections was that they would be liable to become injured by persons cutting them maliciously or from other causes, in which case they would leak, allowing the water to run into the apartment, and causing much damage. Another difficulty was on account of their unsightliness, as the coupling or joint was generally formed of rubber and the pipe of brass, or other metal, and nickel or silver plated, the difference between them being so marked as to render them disagreeable to the eye, and marred the appearance of the work.

The object of my invention is to overcome these difficulties and to provide a protector or covering for these flexible couplings or joints which connect the flush pipe leading from the tank to the horn on the water closet bowl.

My invention consists, generally stated, in combining with the water closet or like bowl, a rubber or like flexible tube connected to the flush pipe and bowl, and a metallic casing surrounding the flexible tube, said metallic casing being of greater internal diameter than the external diameter of said flexible tube, whereby an annular space is formed between the inner surface of said metallic casing and the outer surface of said flexible tube.

It also consists in certain other details of construction which will be more fully hereinafter set forth and claimed.

To enable others skilled in the art to make and use my invention, I will describe the same more fully, referring to the accompanying drawings, in which—

Figure 1 is a sectional view of the flush pipe and coupling connected to the bowl of the water closet and having my improved casing applied thereto. Fig. 2 is a view of the metallic casing. Fig. 3 is a cross section of the coupling or joint on the line 3—3, Fig. 1, and Figs. 4, 5 and 6 are views showing other forms of my invention.

Like letters indicate like parts in each.

As is illustrated in Fig. 1 of the drawings, the water closet is partly shown in section at $a$, and has the horn $b$ extending out therefrom. The spud $c$ fits within the horn $b$ in the ordinary manner and extends out beyond the horn $b$ so as to receive the collar or clamp $d$ which engages therewith and acts with said collar or clamp $d$ to hold the elbow or flexible connection against the horn $b$ of the water closet. This elbow or flexible connection is shown at $e$ and has at one end the flange $f$ which engages with the spud $c$ and clamp $d$ and has the bowl $g$ at the other end within which the flush pipe $h$ is inserted. Surrounding the elbow or flexible tube $e$ is the metallic casing $i$ which is divided longitudinally into two sections or halves $i'$ $i^2$ for convenience in placing the metallic casing $i$ around the elbow or flexible tube $e$, the said metallic casing $i$ being made somewhat larger than the elbow or flexible tube $e$ so as to form the annular space $j$ around the said elbow or flexible tube. The end $i^3$ of the metallic casing $i$ does not abut against the collar or clamp $d$, but leaves the space $k$ between the end $i^3$ and the collar or clamp $d$ for the purposes hereinafter mentioned; the other end $i^4$ having the bowl $l$ formed thereon, and said bowl $l$ fitting around the bowl $g$ on the elbow or flexible tube $e$. In order to clamp and hold the two sections or halves $i'$ $i^2$ of the metallic casing $i$ together while in place around the elbow or flexible tube $e$, a metal ring $m$ is slipped over the end $i^3$ of the metallic casing, this metal ring $m$ being formed of the same material as the metallic casing. A metal cup $n$ clamps or engages with the other end $i^4$ of the metallic casing $i$. Said metallic cup $n$ slides on the flush pipe $h$ and has the enlarged end $o$ which engages with the bowl $l$ on the metallic casing, and so acting to hold the end $i^4$ in position around the elbow or flexible tube.

In Fig. 4 I have shown another form of my invention as applied to an adjustable elbow or flexible tube, such as is shown and described in an application filed by me on March 26, 1892, Serial No. 426,555. These flexible connections have a series of annular flanges $e'$ around the same, any one of which can engage with the spud $c$ and collar or clamp $d$, so that they can be adjusted according to the relative distance between the flush pipe and the horn. The metallic casing $i$ when applied around these adjustable elbows would generally be too short, and in order to avoid having a great number of different sizes of the ordinary kind as shown in Fig. 1, a short section of tubing would be required to complete the distance between the pipe and horn. This tube $p$ rests on the end $i^3$ of the metallic casing $i$ and abuts or presses against the collar or clamp $d$, and being larger in diameter than the metallic casing $i$ and the annular flanges $e'$ on the adjustable elbow, forms an annular space $q$ around the elbow or flexible connection. The tube $p$ resting around the metallic casing $i$ acts as a clamp thereof in place of the metal ring, and holds the sections together around the elbow.

The elbow or flexible tube $e$ has the metal ring $m$ hanging loosely around it near the flange $f$ when the said elbow or flexible tube $e$ is connected up with the spud $c$, collar or clamp $d$ and the flush pide $h$. After they are connected together all that is necessary is to place the two sections or halves $i'$ $i^2$ of the metallic casing $i$ around the elbow or flexible tube $e$ with its bowl $l$ around the bowl $g$ on the elbow or flexible tube $e$. The metal cup $n$ is then slipped down on the flush pipe $h$ until the enlarged end $o$ clamps or engages with the bowl $l$ on the metallic casing, when the metal ring $m$ hanging loosely around the elbow or flexible tube $e$ can be brought up through the space $k$ between the end $i^3$ of the metallic casing $i$ and the collar or clamp $d$, and slipped onto the metallic casing $i$, so clamping and binding the two sections or halves $i'$ $i^2$ of the metallic casing together around the elbow or flexible connection.

By my invention I am enabled to provide a covering or casing for these rubber elbows which is not unsightly, and one which can be formed of the same material and with the same finish as the other work or parts composing the connection from the flush tank to the water closet. The covering or casing will also prevent any malicious cutting of the rubber elbow or any accident thereto which might happen and cause leakage into the apartment in which it is located. The rubber elbow can also have free movement while confined within the covering or casing on account of the annular space therein which allows for expansion and contraction and the settling of the closet. The invention can be easily manufactured and can be connected around the rubber elbow with little trouble, and forms perfect work.

What I claim as my invention, and desire to secure by Letters Patent, is—

1. In connections for water closets and like bowls, the combination of a rubber or like flexible tube connected to the pipe and bowl, and a metallic casing of greater internal diameter than the external diameter of said flexible tube surrounding said flexible tube, whereby an annular space is formed between the inner face of said metallic casing and the outer face of said flexible tube, substantially as and for the purposes set forth.

2. In connections for water closets, and like bowls, the combination of a rubber or like flexible tube connected to the pipe and bowl, and a metallic casing surrounding the flexible tube, said metallic casing being divided longitudinally into two sections and clamped together and clamps engaging said sections at the ends thereof, substantially as and for the purposes set forth.

3. In connections for water closets, and like bowls, the combination of a rubber or like flexible tube connected to the pipe and bowl, and a metallic casing surrounding the flexible tube, said metallic casing being divided longitudinally into two sections and held together by a metal cup around the pipe and a metal ring, substantially as and for the purposes set forth.

4. In connections for water closets and like bowls, the combination of a rubber or like flexible tube connected to the pipe and bowl, a metallic casing surrounding the flexible tube, and a tube section interposed between said metallic casing and the horn, said tube section resting on the metallic casing, substantially as and for the purposes set forth.

In testimony whereof I, the said JAMES J. RICKETTS, have hereunto set my hand.

JAMES J. RICKETTS.

Witnesses:
  JAMES I. KAY,
  J. N. COOKE.